June 12, 1923.

G. L. MALLBERG 1,458,428

METHOD OF AND ARRANGEMENT FOR CUTTING OFF INGOT BLOCKS

Filed Aug. 14, 1922 2 Sheets-Sheet 1

Inventor
G. L. Mallberg
By Marks Clerk Att'ys

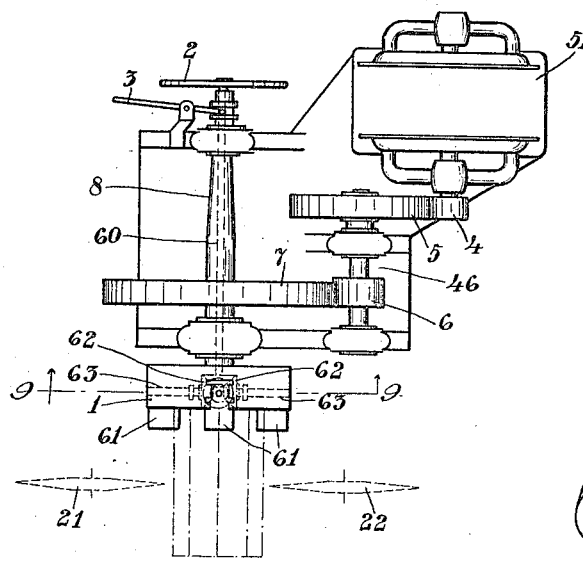
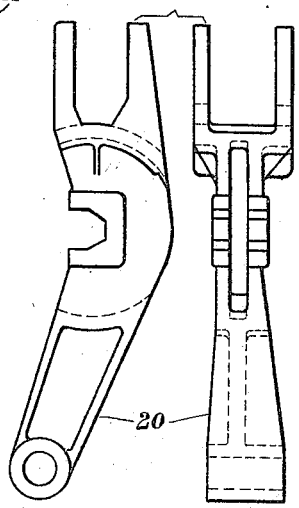
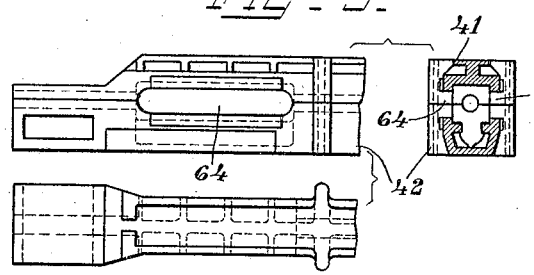
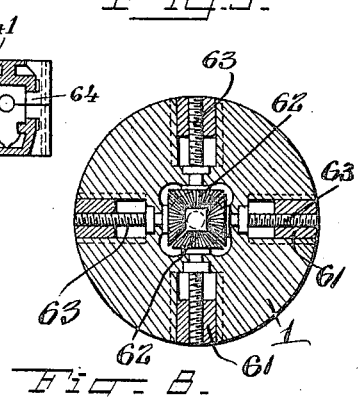
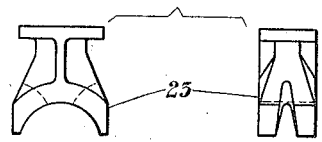
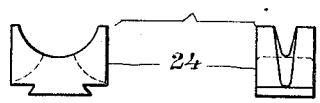

Patented June 12, 1923.

1,458,428

UNITED STATES PATENT OFFICE.

GUSTAF LEONARD MÄLLBERG, OF VASTERAS, SWEDEN.

METHOD OF AND ARRANGEMENT FOR CUTTING OFF INGOT BLOCKS.

Application filed August 14, 1922. Serial No. 581,902.

*To all whom it may concern:*

Be it known that I, GUSTAF LEONARD MÄLLBERG, a subject of the King of Sweden, residing at Foreningsgatan 23, Vasteras, Sweden, have invented certain new and useful Improvement in Methods of and Arrangements for Cutting Off Ingot Blocks, of which the following is a specification.

This invention relates to an improved method of and machine for cutting off steel ingot blocks into forging pieces adapted for wholesale manufacture in swaging factories, such as for railway carriage wheels, toothed wheels, etc. The improved machine is easily adjustable during work in order that the forging pieces may obtain a fixed weight. The cutting off of the forging pieces is effected when the block is yet hot. The cutting surfaces are smooth and need not be finished.

In carrying out my said invention the ingot block is being rotated, one or more cutter discs freely rotatable on their axes and arranged on opposite sides of said block at the same time being pressed against the latter.

With my said improved machine the working expenses will be substantially reduced as compared with prior machines of the same kind.

The invention will be expained more fully hereinbelow, with reference to the accompanying drawings:

Fig. 3 is another partial view in elevation.

Figs. 4–8 are detail views.

Fig. 9 is an enlarged transverse sectional view through the jaw chuck showing the spindles and the connecting gears in elevation.

Figure 1:
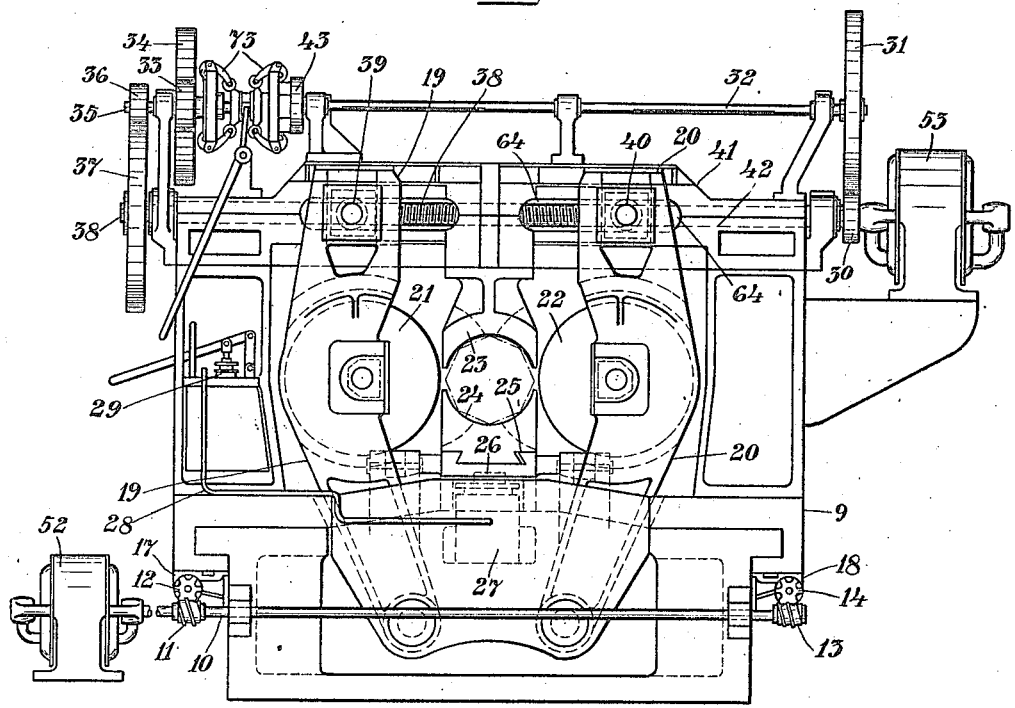
Fig. 1 is a front view of the improved machine.
Figure 2:
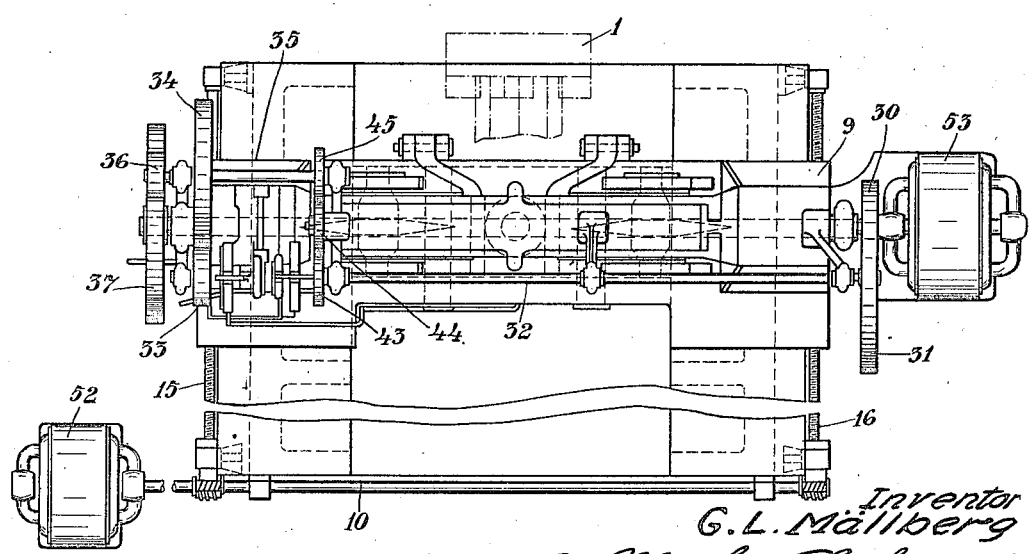
Fig. 2 is a partial view in elevation of said machine.

The ingot block heated to a suitable temperature is arranged with one end thereof in a bearing 23, 24 (Figs. 1, 6, 7) with its other end clamped in a jaw chuck 1 (Figs. 2, 3) by turning the hand wheel 2, the shaft 60 of which is journalled in the shaft 8 supporting the jaw chuck 1 and actuates the jaws 61 by means of the bevelled wheels 62 and screw spindles 63. The cutter discs 21, 22 loosely rotatable in levers 19, 20 on the slide 9 are brought to cutting position by the slide 9 being advanced by means of the motor 52 (Figs. 1, 2). The motion of the slide 9 is effected by said motor by means of the shaft 10, worm gear 11, 12 and 13, 14, the guide spindles 15, 16 and nuts 17, 18 the latter being secured to the slide. The ingot block is adjusted vertically by means of the pump 29 (Fig. 1) the latter being connected to the plunger cylinder 27 by means of the pipe-line 28. The plunger 26 actuates the cross-head 25 (Figs. 1 and 8) and that half-part 24 of the step-bearing (Figs. 1, 7), which is mounted on said cross-head and supports the ingot block from below.

The cutter discs having been placed in the desired position relatively the ingot block the motor 51 (Fig. 3) is immediately started thereby rotating said block. The rotation of the motor 51 is transmitted to the ingot block by means of the gear wheels 4, 5, shaft 46, gear wheels 6, 7 and shaft 8, the motor 53 then being started in order to move the cutter discs 21, 22 against one another. The shaft 8 is removable somewhat longitudinally in its bearings for the purpose indicated below. Due to this, the gear wheel 6 is somewhat broader than the gear wheel 7 on shaft 8. By means of the gear wheels 30, 31, shaft 32, gear wheels 33, 34, shaft 35, gear wheels 36, 37, the right and left hand threaded screw spindle 38 and cross-heads 39, 40 forming nuts the motion of motor 53 is transmitted to the levers 19, 20 and cutter discs 21 and 22 loosely rotatable on said levers thus forcing the cutter discs to cut into the ingot block and by further rotation separate a piece of said block.

During the cutting operation the shaft 8 moves somewhat longitudinally from the position shown in Fig. 1 in the direction away from the discs, being forced to do so by the pressure of the discs when cutting the block. As a result of this arrangement the strains on the block caused by said pressure will not damage any of the parts of the said machine.

The casing-shaped frame 41, 42 in which the screw spindle is journalled, serves as guide for the cross-heads the latter being guided in the upper forked ends of said levers, and the pins of said cross-heads guided in a groove 64 (Figs. 1, 5) in the frame 41, 42.

The ingot block having been cut through by the cutter discs the friction coupling 73 (Fig. 1) is reversed thereby moving said cutter discs 21, 22 from one another the rotation of motor 53 being transmitted by means of the toothed wheels 43, 44 instead of the toothed wheels 33, 34, thus reversing too the rotating motion of the screw spindle 38. The cutter discs having been brought sufficiently apart the motor 53 is stopped and the slide 9 is advanced to be positioned for the next cutting operation. The shaft 8 is then moved longitudinally back to the position of Fig. 1 by means of the hand lever 3, the friction coupling 73 reversed, the motor 53 started and the cutting operation will begin again.

What I claim as new and desire to secure by Letters Patent of the United States of America is:—

1. A machine for cutting off ingot blocks, consisting of means for rotating the block, two circular freely rotatable cutter discs each having a smooth periphery, two levers for supporting the disc and pivotally mounted adjacent one of the ends thereof and arranged on opposite sides of the block, means for pressing the other ends of the levers to and from each other to force the cutter discs into the block and thereby causing the cutter discs to be rotated only by their friction during the cutting operation with the ingot block.

2. A machine for cutting off ingot blocks, consisting of means for rotating the block, two circular freely rotatable cutter discs each having a smooth periphery, two levers arranged on opposite sides of the block and each being pivoted near one of their ends for supporting the discs, means for pressing the other ends of the levers to and from each other, said means consisting of a right and left handed screw, adapted to rotate in the one or other direction to force the cutter discs into the block and thereby causing the cutter discs to be rotated only by their friction during the cutting operation with the ingot block.

3. A machine for cutting off ingot blocks, consisting of means for rotating the block, two circular freely rotatable cutter discs each having a smooth periphery, two pivotally mounted levers arranged on opposite sides of the block for supporting the discs, means for pressing the free ends of the levers to and from each other, said means consisting of a motor, a right and left handed screw, engaging nuts, guided in the swingable ends of the levers, and a transmission device, adapted to transfer a rotary motion to the screw from the motor to force the cutter discs into the block and thereby causing the cutter discs to be rotated only by their friction during the cutting operation with the ingot block.

4. A machine for cutting off ingot blocks, consisting of means for rotating the block, two circular rotatable cutter discs each having a smooth periphery and mounted on opposite sides of the block, means for pressing said discs against each other, each of said cutter discs being freely rotatable around its axis, and means for supporting the discs including a slide movable parallel to the longitudinal axis of said ingot block and two levers pivotally mounted on the slide and arranged on opposite sides of the block and carrying the discs.

5. A machine for cutting off metal blocks consisting of means for rotating the block, two circular cutter discs arranged on opposite sides of the block, levers for supporting said cutter discs, a slide movable parallel to the axis of the block and having the lower ends of the levers journalled therein, means for operating the upper ends of the levers to and from each other consisting of a right and left hand threaded screw.

6. A machine for cutting off metal blocks including a rotatable shaft, a jaw chuck arranged on said rotatable shaft, the jaws of said chuck being adapted to grasp the block, screw spindles engaging the jaws of the chuck, another shaft journalled in said jaw chuck shaft and provided with a handle, means including gear wheels for connecting the spindles with said last mentioned shaft, two circular rotatable cutter discs each having a smooth periphery and mounted on opposite sides of the block, means for pressing said discs against each other and means for permitting the cutter discs to be rotated only by their friction during the cutting operation with the ingot block.

7. A machine for cutting off metal blocks including a rotatable shaft, a jaw chuck arranged on said shaft, the jaws of which are adapted to grasp the block, means for rotating the chuck a handle operable shaft rotatably journalled in the jaw chuck, a plurality of screw spindles mounted in the chuck, gears connecting the spindles with the last mentioned shaft, two circular cutter discs arranged on opposite sides of the block, pivotally mounted levers for supporting the cutter discs, a slide movable parallel to the axis of the block and having the lower ends of the lever journalled therein and means associated with the upper ends of the levers for moving the same relative to each other and including a right and left hand threaded screw.

8. A machine for cutting off ingot blocks consisting of means for rotating the block, two rotatable circular knives with a smooth periphery, which are mounted freely on their shafts on opposite sides of the block and the thickness of which increases from the peripheral edge towards the center, and means for pressing said knives through the block, said means consisting of two pivoted levers in which the said discs are mounted respectively and means whereby said arms may be swung on said pivots to and from each other.

9. A machine as claimed in claim 6 wherein means is provided for permitting the chuck and the shaft to have a limited axial movement.

10. A machine as claimed in claim 6 wherein means is provided for permitting the chuck and the shaft to have a limited axial movement, and a handle for moving said chuck shaft axially.

In testimony whereof I affix my signature in presence of two witnesses.

GUSTAF LEONARD MÄLLBERG.

Witnesses:
   GRETA GUSTAFSON,
   UNO JOHANSSON.